United States Patent
Liu et al.

(10) Patent No.: US 9,455,925 B2
(45) Date of Patent: Sep. 27, 2016

(54) METHOD, DEVICE, AND SYSTEM FOR SELF-ADAPTIVELY ADJUSTING DATA TRANSMISSION RATE

(75) Inventors: Xin Liu, Shenzhen (CN); Zixuan Zou, Shenzhen (CN); Yangpo Xu, Shenzhen (CN); Peiyun Di, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1108 days.

(21) Appl. No.: 13/314,961

(22) Filed: Dec. 8, 2011

(65) Prior Publication Data

US 2012/0079132 A1   Mar. 29, 2012

Related U.S. Application Data

(63) Continuation of application No. PCT/CN2010/073606, filed on Jun. 7, 2010.

(30) Foreign Application Priority Data

Jun. 9, 2009   (CN) .......................... 2009 1 0147902

(51) Int. Cl.
  *G06F 15/16*   (2006.01)
  *H04L 12/823*   (2013.01)
  (Continued)

(52) U.S. Cl.
  CPC ............. *H04L 47/32* (2013.01); *H04L 1/0002* (2013.01); *H04L 47/10* (2013.01); *H04L 47/25* (2013.01); *H04L 47/30* (2013.01); *H04L 49/90* (2013.01);
  (Continued)

(58) Field of Classification Search
  CPC ............................. H04L 47/10; H04L 47/30
  USPC ........................................................ 709/233
  See application file for complete search history.

(56) References Cited

U.S. PATENT DOCUMENTS 6,412,013 B1 * 6/2002 Parthasarathy ..... H04L 12/5602
                                                      375/E7.014
7,292,602 B1   11/2007 Liu et al.
(Continued)

FOREIGN PATENT DOCUMENTS

CN        1557072 A     12/2004
CN        1588909 A      3/2005
(Continued)

OTHER PUBLICATIONS

Office Action issued in corresponding Chinese Patent Application No. 200910147902.7, mailed Aug. 1, 2012.
(Continued)

*Primary Examiner* — Imad Hussain
(74) *Attorney, Agent, or Firm* — Brinks Gilson & Lione (57) ABSTRACT

Embodiments of the present invention disclose a method, a device, and a system for self-adaptively adjusting a data transmission rate, which solve the problem of network buffer overflow. The method includes: receiving parameters sent by a client; calculating a predicted value of a data sending rate according to a maximum value of a network buffer and the received parameters; judging whether the predicted value of the data sending rate is less than an original service bit rate; and if the predicted value of the data sending rate is less than the original service bit rate, discarding data of at least one data unit in a send buffer. The method, the device, and the system are mainly applied to adjust the data transmission rate, and especially to adjust the data transmission rate in a time-varying network.

12 Claims, 5 Drawing Sheets

(51) Int. Cl.
*H04L 12/801* (2013.01)
*H04L 1/00* (2006.01)
*H04L 12/825* (2013.01)
*H04L 12/835* (2013.01)
*H04L 12/861* (2013.01)
*H04L 29/06* (2006.01)

(52) U.S. Cl.
CPC ............ *H04L 65/608* (2013.01); *H04L 65/80* (2013.01); *Y02B 60/31* (2013.01)

(56) References Cited

U.S. PATENT DOCUMENTS

| | | | |
|---|---|---|---|
| 7,369,498 B1* | 5/2008 | Ma | H04L 47/10 370/235 |
| 7,417,991 B1* | 8/2008 | Crawford | H04L 41/5009 370/231 |
| 7,450,571 B2 | 11/2008 | Zhang et al. | |
| 7,453,805 B2 | 11/2008 | Velev et al. | |
| 2002/0057675 A1* | 5/2002 | Park | H04L 29/06 370/352 |
| 2003/0165150 A1 | 9/2003 | Zimmerman et al. | |
| 2004/0098748 A1* | 5/2004 | Bo | H04N 7/17336 725/105 |
| 2004/0242235 A1 | 12/2004 | Witana | |
| 2005/0021830 A1 | 1/2005 | Urzaiz et al. | |
| 2005/0083850 A1 | 4/2005 | Sin et al. | |
| 2005/0201485 A1 | 9/2005 | Fay | |
| 2005/0232151 A1* | 10/2005 | Chapweske | H04L 1/0002 370/231 |
| 2006/0159098 A1 | 7/2006 | Munson et al. | |
| 2006/0259844 A1* | 11/2006 | Kawada | H04L 1/0002 714/748 |
| 2008/0120424 A1* | 5/2008 | Deshpande | H04L 47/10 709/230 |
| 2008/0170630 A1* | 7/2008 | Falik | H04L 47/2416 375/240.29 |
| 2009/0019178 A1 | 1/2009 | Melnyk et al. | |

FOREIGN PATENT DOCUMENTS

| | | |
|---|---|---|
| CN | 1610352 A | 4/2005 |
| CN | 1655547 A | 8/2005 |
| CN | 1656809 A | 8/2005 |
| CN | 1917413 A | 2/2007 |
| CN | 101026509 A | 8/2007 |
| CN | 101043240 A | 9/2007 |
| WO | WO 2005/081465 A1 | 9/2005 |
| WO | WO 2005081465 A1 * | 9/2005 |
| WO | 2009009141 A1 | 1/2009 |

OTHER PUBLICATIONS

Extended European Search Report issued in corresponding European Patent Application No. 10785739.3, mailed Jan. 23, 2012.
Written Opinion of the International Searching Authority issued in corresponding PCT Patent Application No. PCT/CN2010/073606, mailed Sep. 16, 2010.
International Search Report issued in corresponding PCT Patent Application No. PCT/CN2010/073606, mailed Sep. 16, 2010.
Zhou et al., "TFRC Veno: An Enhancement of TCP Friendly Rate Control over Wired/Wireless Networks" IEEE 2007.
Baldo et al., "RTCP Feedback Based Transmission Rate Control for 3G Wireless Multimedia Streaming" IEEE 2004.
Office Action issued in corresponding Chinese Patent Application No. 200910147902.7, mailed Apr. 19, 2013.

* cited by examiner

METHOD, DEVICE, AND SYSTEM FOR SELF-ADAPTIVELY ADJUSTING DATA TRANSMISSION RATE

CROSS-REFERENCE TO RELATED APPLICATIONS

This application is a continuation of International Application No. PCT/CN2010/073606, filed on Jun. 7, 2010, which claims priority to Chinese Patent Application No. 200910147902.7, filed on Jun. 9, 2009, both of which are hereby incorporated by reference in their entireties.

FIELD OF THE INVENTION

The present invention relates to the communication field of a channel time-varying network, and in particular to a method, a device, and a system for self-adaptively adjusting a data transmission rate.

BACKGROUND OF THE INVENTION

Presently, many network applications, for example, streaming media, require low-delay experience of users. End-to-end data transmission in the network applications is realized through a User Datagram Protocol (UDP), while the UDP does not provide a rate adjustment mechanism, so the following problems exist in this case.

First, in the end-to-end transmission of data through the UDP, when the network bandwidth is reduced, or the channel quality deteriorates, the reduced bandwidth cannot transmit the data sent at the current rate, which causes network buffer overflow, and results in loss of the sent data.

Second, when a client buffer is about to be full of data, so that data overflow and then data loss occurs, as the UDP does not provide a rate adjustment mechanism, the data sending rate cannot be lowered, client buffer overflow cannot be avoided, and the sent data will be lost; and when the client buffer is about to be exhausted of data, so that the client will have no data available, as the UDP does not provide the rate adjustment mechanism, the data sending rate cannot be raised, and the client buffer underflow cannot be avoided.

To solve the above problems, the following solution is adopted in the prior art. The client collects statistics on data occupancy in the client buffer, and sends the data occupancy in the buffer to a server; and the server adjusts a gradually increasing or decreasing coefficient of the data sending rate according to the data occupancy in the buffer and a packet loss ratio.

Although the technical solution for preventing the client buffer overflow solves the problem of the client buffer overflow, no statistics is collected on the occupancy of the network buffer between the server and the data client in the technical solution, so the problem of network buffer overflow cannot be prevented.

SUMMARY OF THE INVENTION

The present invention provides a method, a device, and a system for self-adaptively adjusting a data transmission rate, which solves the problem of network buffer overflow.

For the above purpose, the following technical solutions are adopted in embodiments of the present invention.

A method for self-adaptively adjusting a data transmission rate includes:
  receiving parameters sent by a client;
  calculating a predicted value of a data sending rate according to a maximum value of a network buffer and the received parameters;
  judging whether the predicted value of the data sending rate is less than an original service bit rate; and
  if the predicted value of the data sending rate is less than the original service bit rate, discarding data of at least one data unit in a send buffer.

A server includes:
  a receiving unit, configured to receive parameters sent by a client;
  a calculation unit, configured to calculate a predicted value of a data sending rate according to a maximum value of a network buffer and the parameters received by the receiving unit;
  a judgment unit, configured to judge whether the predicted value of the data sending rate, where the predicted value is calculated by the calculation unit, is less than an original service bit rate; and
  a discarding unit, configured to discard data of at least one data unit in a send buffer if the judgment unit judges that the predicted value of the data sending rate is less than the original service bit rate.

A system for self-adaptively adjusting a data transmission rate includes a server and a client:
  the server receives parameters sent by the client, calculates a predicted value of a data sending rate according to a maximum value of a network buffer and the received parameters, judges whether the predicted value of the data sending rate is less than an original service bit rate, and if the predicted value of the data sending rate is less than the original service bit rate, discards data of at least one data unit in a send buffer; and
  the client detects and analyzes a relation between a current value of a client buffer and an expected value of the client buffer and a relation between the current value of the client buffer and a cache triggering condition value, and if the current value of the client buffer is greater than or equal to the cache triggering condition value, and the current value of the client buffer is less than the expected value of the client buffer, sends the parameters to the server.

When the technical solutions in the present invention are adopted, a server calculates a predicted value of a data sending rate according to a maximum value of a network buffer and received parameters, judges, according to a relation between the predicted value of the data sending rate and an original service bit rate, whether network buffer overflow is likely to exist, and when network buffer overflow is likely to exist, discards data of at least one data unit in a send buffer, so as to prevent network buffer overflow.

BRIEF DESCRIPTION OF THE DRAWINGS

To illustrate the technical solutions in the embodiments of the present invention or in the prior art more clearly, accompanying drawings required to be used in the descriptions of the embodiments or the prior art are simply introduced below. Apparently, the accompanying drawings described below merely demonstrate some of the embodiments of the present invention. According to the accompanying drawings, persons of ordinary skill in the art may obtain other accompanying drawings without making creative efforts.

DETAILED DESCRIPTION OF THE EMBODIMENTS

The technical solutions according to the embodiments of the present invention are completely and clearly described below with reference to the accompanying drawings in the embodiments of the present invention. Apparently, the described embodiments are merely a part of the embodiments of the present invention, rather than all the embodiments of the present invention. Other embodiments that is derived by persons of ordinary skill in the art based on the embodiments of the present invention without creative efforts, all fall within the protection scope of the present invention.

Embodiment 1

Figure 1:
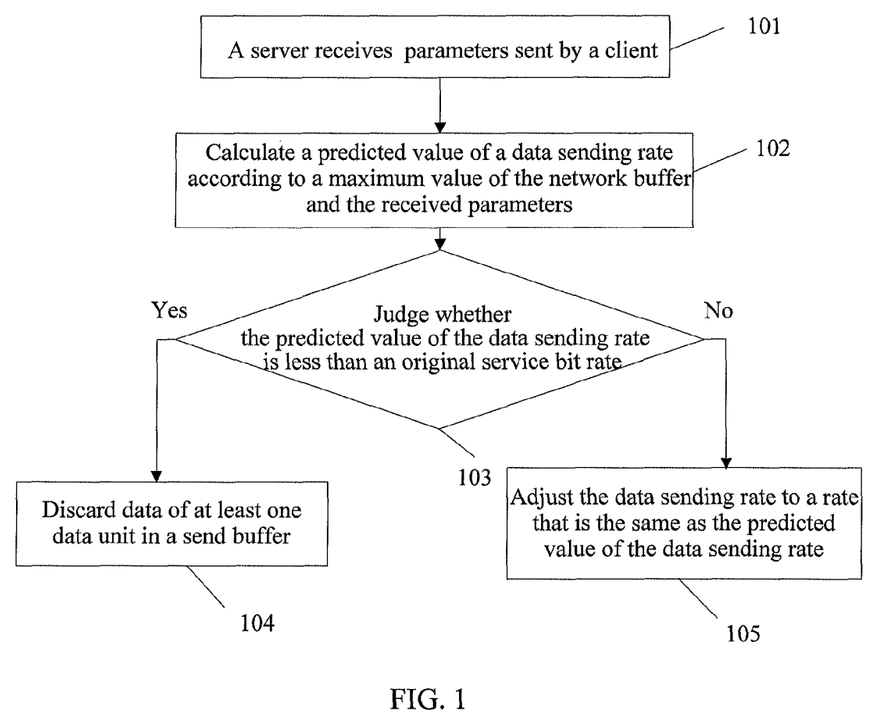
FIG. 1 is a flow chart of a method for self-adaptively adjusting a data transmission rate according to Embodiment 1 of the present invention.

A method for self-adaptively adjusting a data transmission rate is provided in an embodiment of the present invention. As shown in FIG. 1, the method includes:

101: A server receives parameters sent by a client, where the parameters include: a data transmission rate currently received by the client, a maximum sequence number of a Real-time Transfer Protocol (RTP) packet currently received by the client, and a packet loss ratio; or an expected value of a client buffer, a current value of the client buffer, a packet loss ratio, and a maximum sequence number of an RTP packet currently received by the client.

102: After receiving the parameters sent by the client, calculate a predicted value of a data sending rate according to a maximum value of the network buffer and the received parameters.

The calculation of the predicted value of the data sending rate according to the maximum value of the network buffer and the received parameters is performed by using different calculation methods according to different received parameters sent by the client; for example, when the received parameters include the data transmission rate currently received by the client, the maximum sequence number of the RTP packet currently received by the client, and the packet loss ratio, the calculating the predicted value of the data sending rate according to the maximum value of the network buffer and the received parameters specifically is:

calculating a current value of the network buffer according to the received maximum sequence number of the RTP packet currently received by the client and the packet loss ratio; and calculating the predicted value of the data sending rate according to the maximum value of the network buffer, the received data transmission rate currently received by the client, and the calculated current value of the network buffer.

103: After calculating the predicted value of the data sending rate, judge whether the predicted value of the data sending rate is less than an original service bit rate, where the original service bit rate is specifically an encoding rate for the server to modulate data or a rate for the server to receive data. If the predicted value of the data sending rate is less than the original service bit rate, perform step 104. If the predicted value of the data sending rate is not less than the original service bit rate, perform step 105. A relation between a read speed (that is, the predicted value of the data sending rate) and a write speed (that is, the original service bit rate) of the network buffer decides whether the network buffer is likely to overflow: if the read speed is less than the write speed, the data in the network buffer is increased continuously, which will finally result in network buffer overflow; on the contrary, if the read speed is greater than or equal to the write speed, the data in the network buffer will not be increased continuously, so the network buffer will not overflow.

104: Discard data of at least one data unit in a send buffer, where the data unit varies with different sent services sent, for example, when the service is a media stream, the data unit is a frame.

105: Adjust the data sending rate to a rate that is the same as the predicted value of the data sending rate.

Figure 2:
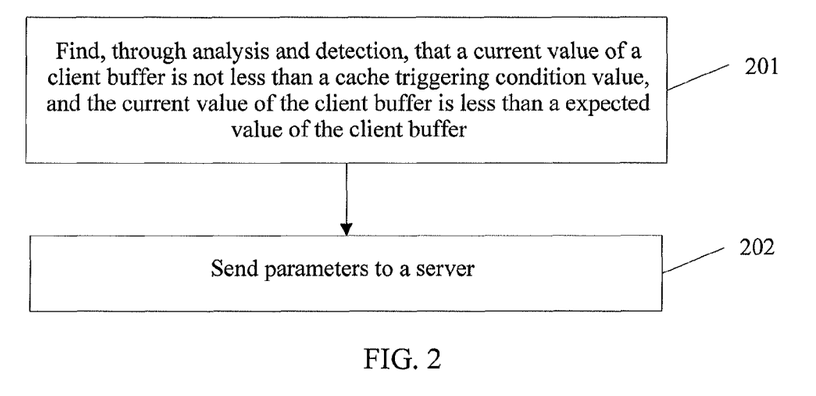
FIG. 2 is a flow chart of a method for self-adaptively adjusting a data transmission rate according to Embodiment 1 of the present invention.

A method for self-adaptively adjusting a data transmission rate is provided in the embodiment of the present invention. As shown in FIG. 2, the method includes:

201: A client detects and analyzes a relation between a current value of a client buffer and an expected value of the client buffer and a relation between the current value of the client buffer and a cache triggering condition value; and if the relation between the current value of the client buffer and the expected value of the client buffer and the relation between the current value of the client buffer and the cache triggering condition value, where the relations are obtained through detection and analysis by the client, are that the current value of the client buffer is greater than or equal to the cache triggering condition value, and the current value of the client buffer is less than the expected value of the client buffer, perform step 202.

When the current value of the client buffer is less than the cache triggering condition value, or is greater than the maximum value of the client buffer, the client buffer overflows; and when the current value of the client buffer is greater than the expected value of the client buffer, but is less than or equal to the maximum value of the client buffer, the client buffer is likely to overflow.

202: Send parameters to a server, so that the server judges whether the network buffer is likely to overflow according to the parameters.

Figure 3:
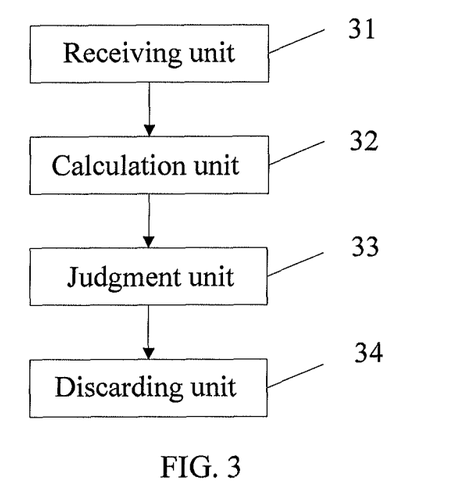
FIG. 3 is a compositional block diagram of a server according to Embodiment 1 of the present invention.

A server is provided in the embodiment of the present invention. As shown in FIG. 3, the server includes: a receiving unit 31, a calculation unit 32, a judgment unit 33, and a discarding unit 34.

The receiving unit 31 is configured to receive parameters sent by a client, where the parameters include: a data transmission rate currently received by the client, a maximum sequence number of an RTP packet currently received by the client, and a packet loss ratio; or an expected value of a client buffer, a current value of the client buffer, a packet loss ratio, and a maximum sequence number of an RTP packet currently received by the client.

After the receiving unit 31 receives the parameters sent by the client, the calculation unit 32 calculates a predicted value of a data sending rate according to a maximum value of the network buffer and the parameters received by the receiving unit 31; after the calculation unit 32 calculates and obtains the predicted value of the data sending rate, the judgment unit 33 judges whether the predicted value of the data sending rate is less than an original service bit rate; and if the judgment unit 33 judges that the predicted value of the data sending rate is less than the original service bit rate, the discarding unit 34 discards data of at least one data unit in a send buffer, where the data unit varies with different sent services, for example, when the service is a media stream, the data unit is a frame.

Figure 4:
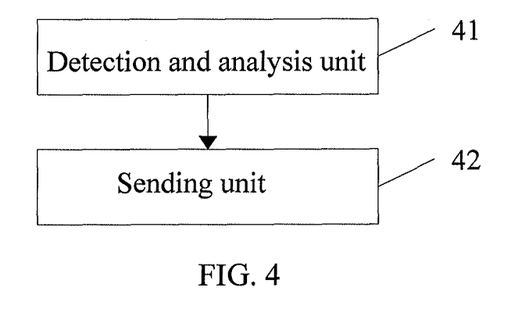
FIG. 4 is a compositional block diagram of a client according to Embodiment 1 of the present invention.

A client is provided in the embodiment of the present invention. As shown in FIG. 4, the client includes: a detection and analysis unit 41 and a sending unit 42.

The detection and analysis unit 41 is configured to detect and analyze a relation between a current value of a client buffer and an expected value of the client buffer and a relation between the current value of the client buffer and a cache triggering condition value; and if the detection and analysis unit 41 finds, through detection and analysis, that the current value of the client buffer is greater than or equal to the cache triggering condition value, and the current value of the client buffer is less than the expected value of the client buffer, the sending unit 42 sends parameters to a server, so that the server judges, according to the parameters, whether a network buffer is likely to overflow.

Figure 5:
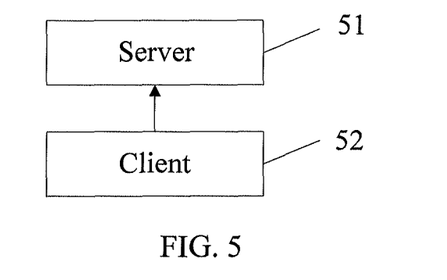
FIG. 5 is a compositional block diagram of a system for self-adaptively adjusting a data transmission rate according to Embodiments 1 and 2 of the present invention.

A system for self-adaptively adjusting a data transmission rate is provided in the embodiment of the present invention. As shown in FIG. 5, the system includes: a server 51 and a client 52. As for specific implementation of the server 51 and the client 52, reference may be made to the foregoing description, which will not be repeated herein.

The server 51 receives parameters sent by the client 52, calculates a predicted value of a data sending rate according to a maximum value of a network buffer and the received parameters, judges whether the predicted value of the data sending rate is less than an original service bit rate, and if the predicted value of the data sending rate is less than the original service bit rate, discards data of at least one data unit in a send buffer.

The client 52 detects and analyzes a relation between a current value of a client buffer and an expected value of the client buffer and a relation between the current value of the client buffer and a cache triggering condition value, and if the current value of the client buffer is greater than or equal to the cache triggering condition value, and the current value of the client buffer is less than the expected value of the client buffer, sends the parameters to the server.

In the embodiment of the present invention, it is judged, according to the parameters of the client buffer, whether the client buffer overflows and is likely to overflow, and when overflow and a likely overflow of the client buffer does not exist, the parameters for the server to adjust the data sending rate are sent to the server, and the server calculates a predicted value of the data sending rate according to the maximum value of the network buffer and the received parameters, and judges whether the network buffer is likely to overflow, and when network buffer overflow is likely to exist, the server discards data of at least one data unit in the send buffer, so as to prevent the network buffer overflow. Meanwhile, as when the network buffer overflows, the data received by the client is not accurate, so that the problem of the client buffer overflow cannot be solved by adjusting the data sending rate; while in the embodiment of the present invention, the network buffer overflow is prevented, so that the data received by the client is accurate, and the problem of the client buffer overflow may be solved by adjusting the data sending rate.

Embodiment 2

Figure 6:
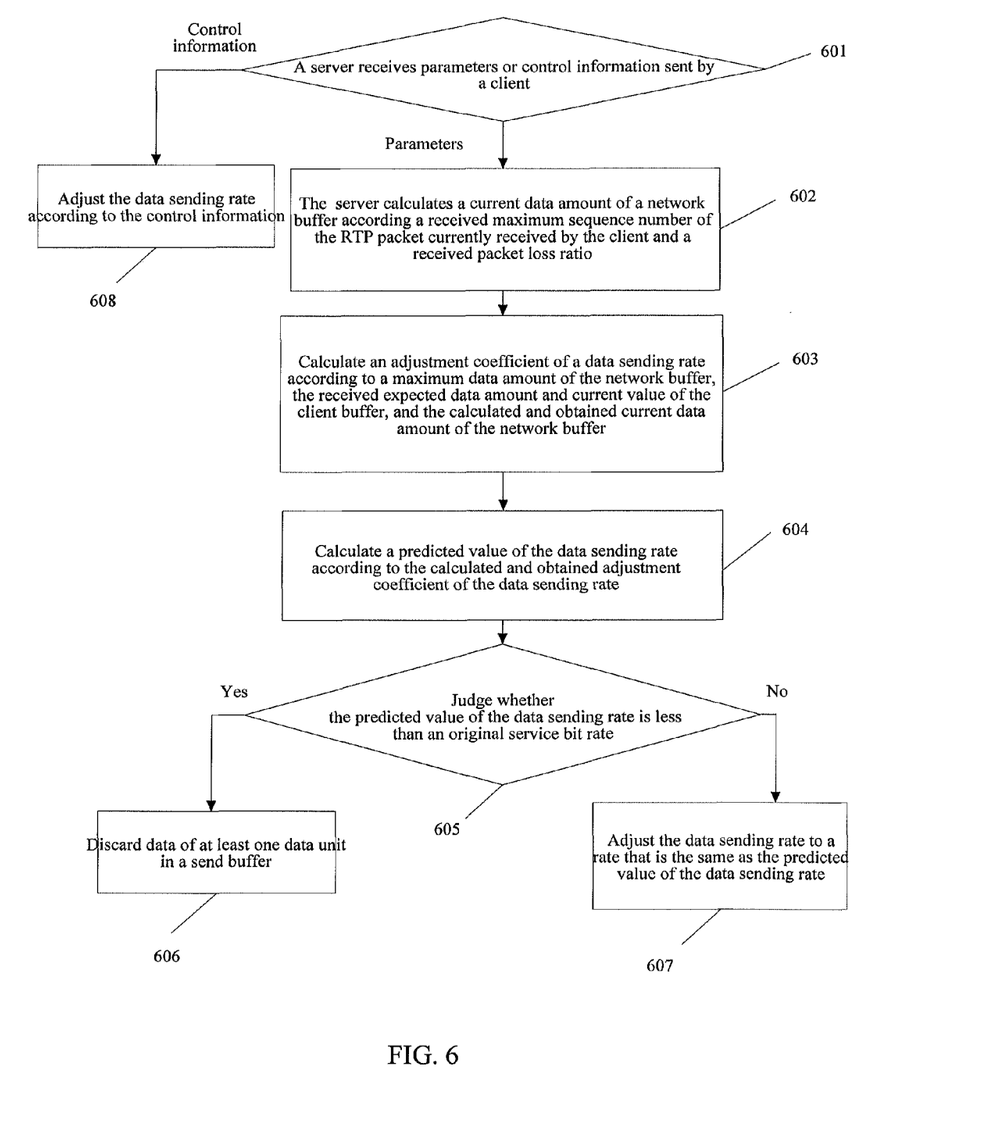
FIG. 6 is a flow chart of a method for self-adaptively adjusting a data transmission rate according to Embodiment 2 of the present invention.

A method for self-adaptively adjusting a data transmission rate is provided in the embodiment of the present invention. As shown in FIG. 6, the method includes:

601: A server receives parameters or control information sent by a client; if the server receives the parameters sent by the client, perform step 602; and if the server receives the control information sent by the client, perform step 608.

The parameters include: a data transmission rate currently received by the client, a maximum sequence number of an RTP packet currently received by the client, and a packet loss ratio; or an expected value of a client buffer, a current value of the client buffer, a packet loss ratio, and a maximum sequence number of an RTP packet currently received by the client.

In the embodiment of the present invention, the received parameters including the expected value of the client buffer, the current value of the client buffer, the packet loss ratio, and the maximum sequence number of the RTP packet currently received by the client are taken as an example for detailed illustration; the current value of the client buffer includes: a current data amount of the client buffer or a playing time of a current data amount of a client network buffer; and the expected value of the client buffer includes: an expected data amount of the client buffer or a playing time of an expected data amount of the client network buffer.

When the foregoing parameters are used, if a parameter of the data amount is used, all parameters used are parameters of the data amount; and if a parameter of the playing time of the data amount is used, all parameters used are parameters of the playing time of the data amount. In the embodiment of the present invention, the parameters of the data amount are taken as an example for detailed illustration.

602: The server calculates a current data amount of the network buffer according the received maximum sequence number of the RTP packet currently received by the client and the received packet loss ratio.

The server may calculate the current data amount of the network buffer according to the formula: $B_n = MTU*(SN_s - SN_c)*(1+plr)$, where $B_n$ is a current value of the network buffer, and is the current data amount of the network buffer in this embodiment, MTU is a maximum length of the RTP packet, $SN_s$ is a sequence number of a latest RTP packet sent by the server, $SN_c$ is the maximum sequence number of the RTP packet currently received by the client, and plr is the packet loss ratio.

603: Calculate an adjustment coefficient of a data sending rate, according to a maximum data amount of the network buffer, the received expected data amount and current value of the client buffer, and the calculated and obtained current data amount of the network buffer.

The adjustment coefficient of the data sending rate may be calculated according to the following formula:

$$k = \frac{B_e - cB_n}{B_o},$$

where k is the adjustment coefficient of the data sending rate, $$c = \frac{1}{\sqrt{B_{nmax}}} \cdot \frac{B_e}{\sqrt{B_n}}$$

is a coefficient, $B_e$ is the current data amount of the client buffer, $B_o$ is the expected data amount of the client buffer, $B_n$ is the current data amount of the network buffer, and $B_{nmax}$ is the maximum data amount of the network buffer.

604: Calculate a predicted value of the data sending rate according to the calculated and obtained adjustment coefficient of the data sending rate. Specifically, a data sending rate of a last cycle is multiplied by the adjustment coefficient of the data sending rate, so as to obtain a predicted value of the data sending rate.

605: Judge whether the predicted value of the data sending rate is less than an original service bit rate, where the original service bit rate is specifically an encoding rate for the server to modulate data or a rate for the server to receive data; if the predicted value of the data sending rate is less than the original service bit rate, perform step 606: and if the predicted value of the data sending rate is not less than the original service bit rate, perform step 607.

606: Discard data of at least one data unit in a send buffer, and end the adjustment of the data sending rate.

The discarding the data of at least one data unit in the send buffer specifically is: sequencing the data in the send buffer according to importance of influence on user experience; and successively select and discard data of at least one data unit from the sequenced data in an order from low to high importance of influence on user experience.

The data unit varies with different services sent, for example, when the service is a media stream, the data unit is a frame.

607: Adjust the data sending rate to a rate that is the same as the predicted value of the data sending rate, and end the adjustment of the data sending rate.

608: After receiving the control information sent by the client, the server adjusts the data sending rate according to the control information, and ends the adjustment of the data sending rate.

When the control information is control information about lowering the data sending rate, the data sending rate is adjusted to any rate lower than a current rate.

When the control information is control information about suspending sending data, it is judged whether the sent data is a real-time service, and if the sent data is a non-real-time service, the sending of the data is suspended; and if the sent data is a real-time service, the data of at least one data unit in the send buffer is discarded.

When the control information is control information about sending data according to an original service bit rate, the data sending rate is adjusted to a rate that is the same as the original service bit rate.

When the parameters received by the server include the data transmission rate currently received by the client, the maximum sequence number of the RTP packet currently received by the client, and the packet loss ratio, the calculating the predicted value of the data sending rate according to the maximum value of the network buffer and the received parameters specifically is:

calculating a current value of the network buffer according to the received maximum sequence number of the RTP packet currently received by the client and the received packet loss ratio, where a specific formula for calculating the current value of the network buffer is the same as that in step 602.

The calculating the predicted value of the data sending rate according to the maximum value of the network buffer, the received data transmission rate currently received by the client, and the calculated current value of the network buffer specifically is adjusting the data sending rate according to the following formula:

$$v_i = \left(v_{i-1} + \frac{v_c - v_{i-1}}{4}\right)$$

$$speed = \sqrt{\frac{0.8 \cdot B_{nmax}}{B_n}} \cdot v_i$$

where $V_c$ is the data transmission rate currently received by the client, $V_{i-1}$ is a data sending rate of a last cycle, $V_i$ is a current data sending rate, $B_{nmax}$ is the maximum value of the network buffer, $B_n$ is the current value of the network buffer, and speed is the predicted value of the data sending rate.

Figure 7:
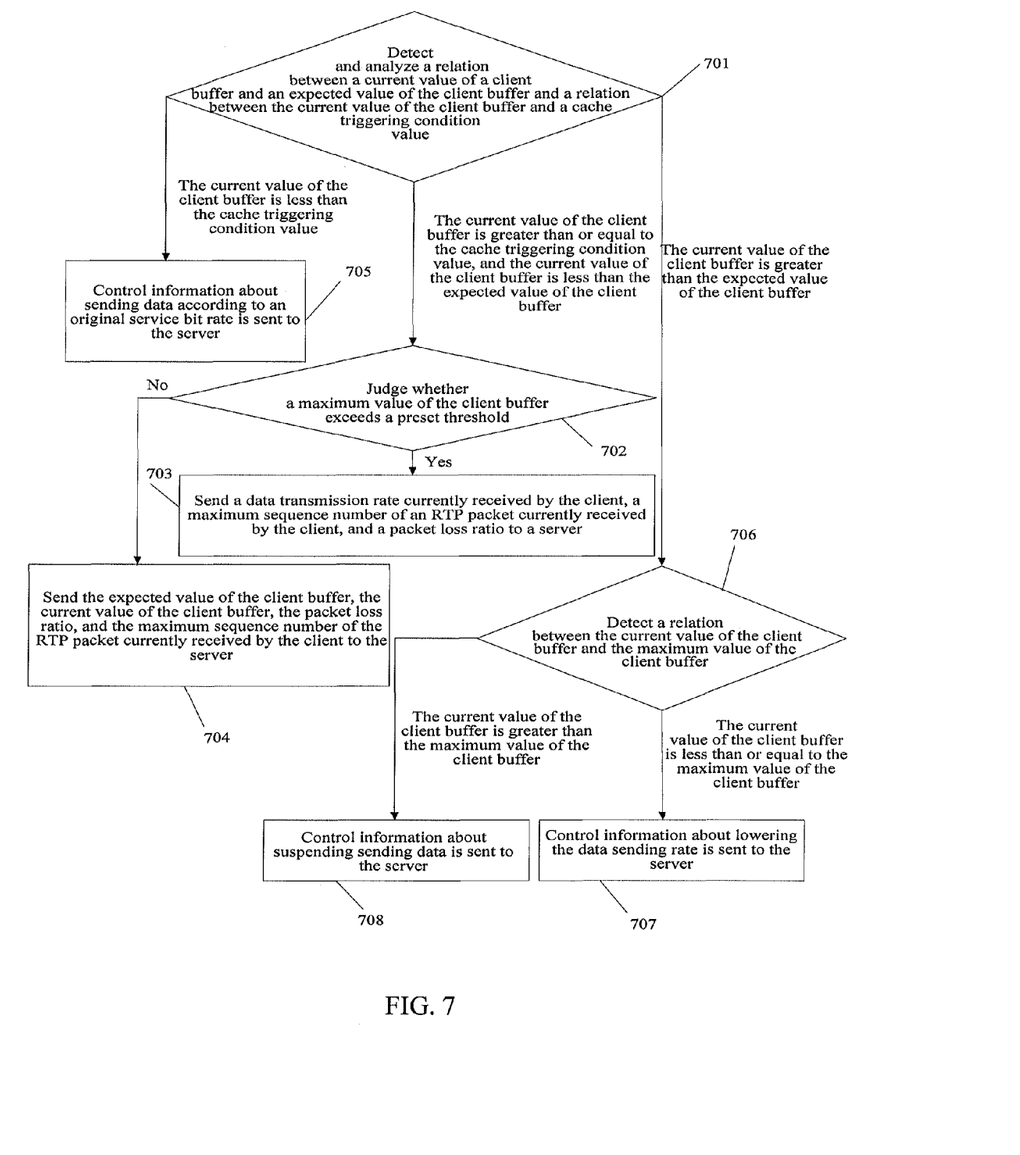
FIG. 7 is a flow chart of a method for self-adaptively adjusting a data transmission rate according to Embodiment 2 of the present invention.

A method for self-adaptively adjusting a data transmission rate is provided in the embodiment of the present invention. As shown in FIG. 7, the method includes:

701: A client detects and analyzes a relation between a current value of a client buffer and an expected value of the client buffer and a relation between the current value of the client buffer and a cache triggering condition value; if the current value of the client buffer is greater than or equal to the cache triggering condition value, and the current value of the client buffer is less than the expected value of the client buffer, perform step 702; if the current value of the client buffer is less than the cache triggering condition value, perform step 705; and if the current value of the client buffer is greater than the expected value of the client buffer, perform step 706.

The current value of the client buffer includes: a current data amount of the client buffer or a playing time of a current data amount of a client network buffer; the expected value of the client buffer includes: an expected data amount of the client buffer or a playing time of an expected data amount of the client network buffer; and the cache triggering condition value includes: a data amount of client buffer underflow or a playing time of a data amount of client buffer underflow When the parameters are used, if a parameter of the data amount is used, all parameters used are parameters of the data amount; and if a parameter of the playing time of the data amount is used, all parameters used are parameters of the playing time of the data amount.

702: Judge whether a maximum value of the client buffer exceeds a preset threshold, where the preset threshold is an empirical value, for example, a data amount, for judging the size of the client buffer. When the maximum value of the client buffer exceeds the preset threshold, perform step 703; and when the maximum value of the client buffer does not exceed the preset threshold, perform step 704.

703: Send a data transmission rate currently received by the client, a maximum sequence number of an RTP packet currently received by the client, and a packet loss ratio to a server, so that the server judges, according to the parameters, whether the network buffer is likely to overflow.

704: Send the expected value of the client buffer, the current value of the client buffer, the packet loss ratio, and the maximum sequence number of the RTP packet currently received by the client to the server, so that the server judges, according to the parameters, whether the network buffer is likely to overflow.

705: The client sends control information about sending data according to an original service bit rate to the server, so that the server adjusts the data sending rate according to the control information, so as to prevent the client buffer underflow.

706: The client detects a relation between the current value of the client buffer and the maximum value of the client buffer; if the current value of the client buffer is less than or equal to the maximum value of the client buffer, perform step 707; and if the current value of the client buffer is greater than the maximum value of the client buffer, perform step 708.

707: The client sends control information about lowering the data sending rate to the server, so that the server adjusts the data sending rate according to the control information, so as to prevent the client buffer overflow.

708: The client sends control information about suspending sending data to the server, so that the server adjusts the data sending rate according to the control information, so as to reduce packet loss caused by the client buffer overflow.

Figure 8:
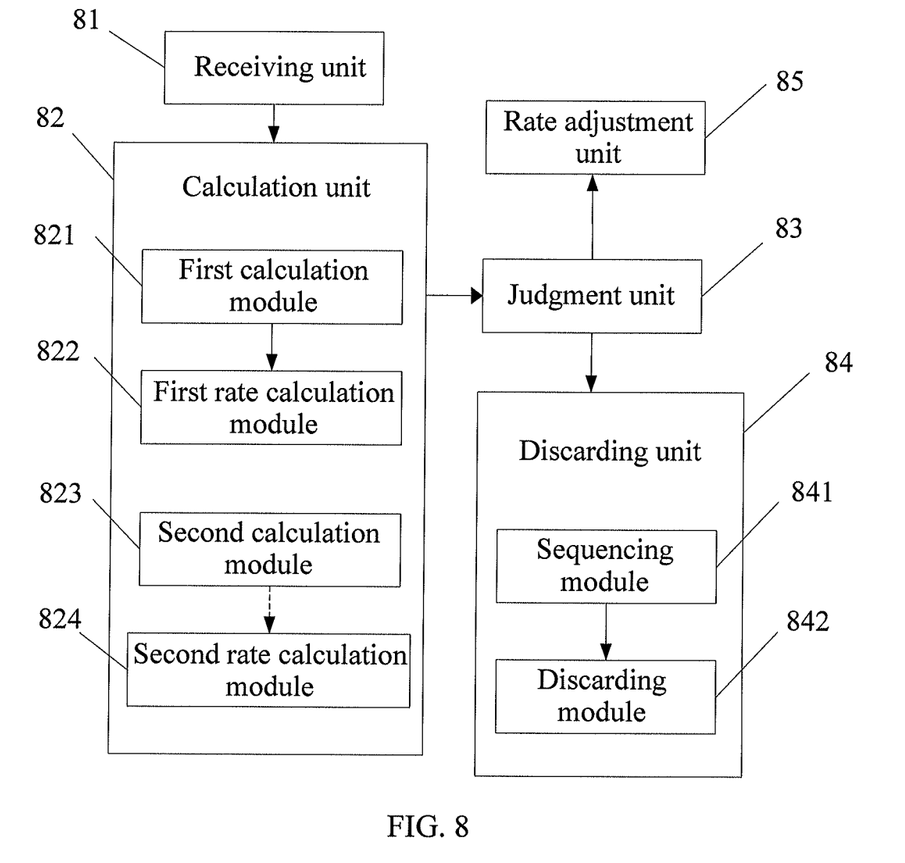
FIG. 8 is a compositional block diagram of a server according to Embodiment 2 of the present invention.

A server is provided in the embodiment of the present invention, as shown in FIG. 8, including: a receiving unit 81, a calculation unit 82, a judgment unit 83, a discarding unit 84, and a rate adjustment unit 85.

The server receives, through the receiving unit 81, parameters or control information sent by a client; when the server receives the parameters sent by the client, the calculation unit 82 calculates a predicted value of a data sending rate according to a maximum value of a network buffer and the parameters received by the receiving unit 81; after the calculation unit 82 calculates the predicted value of the data sending rate, the judgment unit 83 judges whether the predicted value of the data sending rate is less than an original service bit rate, and if the judgment unit 83 judges that the predicted value of the data sending rate is less than the original service bit rate, the discarding unit 84 discards data of at least one data unit in a send buffer; and if the judgment unit 83 judges that the predicted value of the data sending rate is not less than the original service bit rate, the rate adjustment unit 85 adjusts the data sending rate to a rate that is the same as the predicted value of the data sending rate.

When the receiving unit 81 receives the control information sent by the client, the rate adjustment unit 85 is further configured to adjust the data sending rate according to the control information received by the receiving unit 81.

When the control information received by the receiving unit 81 is control information about lowering the data sending rate, the rate adjustment unit 85 adjusts the data sending rate to any rate lower than a current rate; when the control information received by the receiving unit 81 is control information about suspending sending data, the rate adjustment unit 85 judges whether the sent data is a real-time service, and if the rate adjustment unit 85 judges that the sent data is a non-real-time service, the rate adjustment unit 85 suspends sending the data; and if the rate adjustment unit 85 judges that the sent data is a real-time service, the discarding unit 84 is further configured to discard data of at least one data unit in the send buffer.

The calculation unit 82 may include a first calculation module 821 and a first rate calculation module 822.

When the parameters received by the receiving unit 81 include an expected value of a client buffer, a current value of the client buffer, a maximum sequence number of an RTP packet currently received by the client, and a packet loss ratio, the first calculation module 821 calculates a current value of the network buffer according to the received maximum sequence number of the RTP packet currently received by the client and the received packet loss ratio; after the first calculation module 821 calculates and obtains the current value of the network buffer, the first rate calculation module 822 is configured to calculate an adjustment coefficient of the data sending rate according to the maximum value of the network buffer, the received expected value and current value of the client buffer, and the current value of the network buffer, where the current value of the network buffer is calculated and obtained by the first calculation module 821; and after the first rate calculation module 822 calculates the adjustment coefficient of the data sending rate, the first rate calculation module 822 is further configured to multiply a data sending rate of a last cycle by the adjustment coefficient of the data sending rate, so as to obtain the predicted value of the data sending rate.

The calculation unit 82 may further calculate the predicted value of the data sending rate according to the maximum value of the network buffer and the parameters received by the receiving unit 81 in the following manner, as specifically shown by the dashed part in FIG. 8, where the calculation unit 82 includes: a second calculation module 823 and a second rate calculation module 824.

When the parameters received by the receiving unit 81 include the data transmission rate currently received by the client, the maximum sequence number of the RTP packet currently received by the client, and the packet loss ratio, the second calculation module 823 calculates a current value of the network buffer according to the received maximum sequence number of the RTP packet currently received by the client and the received packet loss ratio; and after the second calculation module 823 calculates and obtains the current value of the network buffer, the second rate calculation module 824 is configured to calculate a predicted value of the data sending rate according to the maximum value of the network buffer, the received data transmission rate currently received by the client, and the calculated current value of the network buffer.

The discarding unit 84 includes: a sequencing module 841 and a discarding module 842.

When the discarding unit 84 discards data of at least one data unit in the send buffer, first, the sequencing module 841 sequences the data in the send buffer according to importance of influence on user experience in an ascending or descending order; and after the sequencing module 841 sequences the data, the discarding unit 84 successively selects and discards, through the discarding module 842, data of at least one data unit from the sequenced data in an order from low to high importance of influence on user experience.

Figure 9:
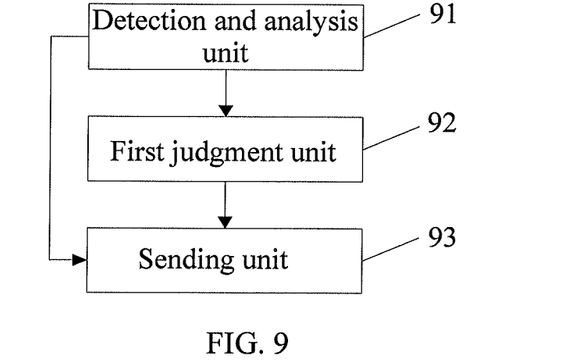
FIG. 9 is a compositional block diagram of a client according to Embodiment 2 of the present invention.

A client is provided in the embodiment of the present invention. As shown in FIG. 9, the client includes: a detection and analysis unit 91, a first judgment unit 92, and a sending unit 93.

The client detects and analyzes, through the detection and analysis unit 91, a relation between a current value of a client buffer and an expected value of the client buffer and a relation between the current value of the client buffer and a cache triggering condition value; when the detection and analysis unit 91 finds, through detection and analysis, that the current value of the client buffer is greater than or equal to the cache triggering condition value, and the current value of the client buffer is less than the expected value of the client buffer, the client judges, through the first judgment unit 92, whether a maximum vale of the client buffer exceeds a preset threshold, where the preset threshold is an empirical value for judging the size of the client buffer.

If the first judgment unit 92 judges that the maximum value of the client buffer exceeds the preset threshold, the sending unit 93 sends a data transmission rate currently received by the client, a maximum sequence number of an RTP packet currently received by the client, and a packet loss ratio to a server; and if the first judgment unit 92 judges that the maximum vale of the client buffer does not exceed the preset threshold, the sending unit 93 sends the expected value of the client buffer, the current value of the client buffer, a packet loss ratio, and a maximum sequence number of an RTP packet currently received by the client to a server.

If the detection and analysis unit 91 finds, through detection and analysis, that the current value of the client buffer is less than the cache triggering condition value, control information about sending data according to an original service bit rate is sent by the client to the server through the sending unit 93.

If the detection and analysis unit 91 finds, through detection and analysis, that the current value of the client buffer is greater than the expected value of the client buffer, the client detects and analyzes a relation between the current value of the client buffer and the maximum value of the client buffer through the detection and analysis unit 91; if the detection and analysis unit 91 finds that the current value of the client buffer is greater than the expected value of the client buffer, and the current value of the client buffer is less than or equal to the maximum value of the client buffer, control information about lowering the data sending rate is sent by the client to the server through the sending unit 93; and if the detection and analysis unit 91 finds, through detection and analysis, that the current value of the client buffer is greater than the maximum value of the client buffer, control information about suspending sending data is sent by the client to the server through the sending unit 93.

A system for self-adaptively adjusting a data transmission rate is provided in the embodiment of the present invention. As shown in FIG. 5, the system includes: a server 51 and a client 52. As for specific implementation of the server 51 and the client 52, reference may be made to the foregoing description, which will not be repeated herein.

The server 51 receives parameters or control information sent by the client 52, if the server 51 receives the parameters sent by the client, the server 51 calculates a predicted value of a data sending rate according to a maximum value of a network buffer and the received parameters, judges whether the predicted value of the data sending rate is less than an original service bit rate, and if the predicted value of the data sending rate is less than the original service bit rate, discards data of at least one data unit in a send buffer; and if the server 51 receives the control information sent by the client, the server 51 adjusts a data sending rate according to the received control information.

The client 52 detects and analyzes a relation between a current value of a client buffer and an expected value of the client buffer and a relation between the current value of the client buffer and a cache triggering condition value, and if the client 52 finds, through detection and analysis, that the current value of the client buffer is greater than or equal to the cache triggering condition value, and the current value of the client buffer is less than the expected value of the client buffer, the client 52 sends the parameters to the server; if the client 52 finds, through detection and analysis, that the current value of the client buffer is less than the cache triggering condition value, control information about sending data according to an original service bit rate is sent by the client 52 to the server; if the client 52 finds, through detection and analysis, that the current value of the client buffer is greater than the expected value of the client buffer, and the current value of the client buffer is less than or equal to the maximum value of the client buffer, control information about lowering the data sending rate is sent by the client 52 to the server; and if the client 52 finds, through detection and analysis, that the current value of the client buffer is greater than the maximum value of the client buffer, control information about suspending sending data is sent by the client 52 to the server.

In the embodiment of the present invention, when it is judged, according to the parameters of the client buffer, that overflow and a likely overflow of the client buffer does not exist, the parameters for the server to adjust the data sending rate are sent to the server; and when the server calculates the predicted value of the data sending rate according to the maximum value of the network buffer and the parameters and judges that network buffer overflow is likely to exist, the server discards data of at least one data unit in the send buffer, so as to prevent the network buffer overflow.

Furthermore, when the client judges, according to the parameters of the client buffer, that the client buffer is likely to overflow, the client notifies the server of lowering the data sending rate, so as to prevent the client buffer overflow and ensure that the transmitted data is not lost; when the client judges, according to the parameters of the client buffer, that the client buffer has overflowed, the client notifies the server of suspending sending the data, so as to prevent data of the client buffer from further overflowing and being lost; and when the client judges, according to the parameters of the client buffer, that the client buffer has underflowed, the client notifies the server of accelerating sending the data, so as to complement the data amount in the client buffer and avoid underflow of the client buffer.

When the server judges, according to the parameters sent by the client, that the network buffer is likely to overflow, the server discards data of at least one data unit in the send buffer, so as to avoid that the packet loss due to the network buffer overflow causes inaccurate data transmitted to the client, and at the same time, avoid overflow of the client network buffer due to the change of the rate; furthermore, when the data of at least one data unit in the send buffer is discarded, the data of lower importance of influence on user experience is selected and discarded, so as to prevent the data of higher importance of influence on user experience from being randomly discarded, and improve the low-delay experience of users.

Through the above description of the embodiments, persons skilled in the art may clearly understand that the present invention may be accomplished in a manner of software plus necessary universal hardware, and definitely may also be accomplished by hardware, but in many cases, the former is a better embodiment. Based on such understanding, the essence of the technical solutions of the present invention or the part that makes contributions to the prior art may be embodied in the form of a software product. The computer software product may be stored in a readable storage medium, for example, a floppy disk, a hard disk, or an optical disk of the computer, and include several instructions for instructing computer equipment (for example, a personal computer, a server, or network equipment) to perform the methods according to the embodiments of the present invention.

What are described above are merely specific embodiments of the present invention, but do not limit the protection scope of the present invention. Modifications or replacements that are easily figured out by persons skilled in the art within the technical scope of the present invention shall fall within the protection scope of the present invention. Therefore, the protection scope of the present invention is subject to the appended claims.

What is claimed is:

1. A method for self-adaptively adjusting a data transmission rate, comprising:
receiving by a server, parameters sent from a client;
calculating by the server, a predicted value of a new data transmission rate from the server to the client, according to an initial data transmission rate based on a ratio of maximum storage value and current storage value of a network buffer in the server and according to the received parameters;
determining by the server, whether the predicted value of the new data transmission rate from the server to the client is less than an original service bit rate which comprises a write speed of the network buffer in the server;
predicting by the server, an overflow of the network buffer in the server by comparing the predicted value of the new data transmission rate from the server to the client and the original service bit rate of the network buffer in the server, wherein the overflow of the network buffer in the server takes place when the write speed is greater than a read speed of the network buffer in the server; and
adjusting by the server, the initial data transmission rate to the predicted value of a new data transmission rate from the server to the client, if the predicted value of the new data transmission rate from the server to the client is not less than the original service bit rate, otherwise, discarding data of at least one data unit in a send buffer of the server.

2. The method for self-adaptively adjusting a data transmission rate according to claim 1, wherein when the received parameters comprise an expected value of a client buffer, a current value of the client buffer, a maximum sequence number of a Real-time Transfer Protocol (RTP) packet currently received by the client, and a packet loss ratio in the client, calculation of the predicted value of the new data transmission rate comprises:
calculating the current value of the network buffer in the server according to the received maximum sequence number of the RTP packet currently received by the client and the received packet loss ratio in the client;
calculating an adjustment coefficient of the new data transmission rate according to the maximum value of the network buffer in the server, the received expected value the received current value of the client buffer, and the calculated current value of the network buffer in the server; and
multiplying a data transmission rate of a last cycle by the adjustment coefficient of the new data transmission rate, so as to obtain the predicted value of the new data transmission rate.

3. The method for self-adaptively adjusting a data transmission rate according to claim 1, wherein when the received parameters comprise a data transmission rate currently received by the client, a maximum sequence number of an RTP packet currently received by the client, and a packet loss ratio in the client, the calculation of the predicted value of the new data transmission rate according to the maximum value of the network buffer in the server and the received parameters comprises:
calculating a current value of the network buffer in the server according to the received maximum sequence number of the RTP packet currently received by the client and the received packet loss ratio; and
calculating the predicted value of the new data transmission rate according to the ratio of maximum value and the calculated current value of the network buffer in the server, and the received data transmission rate currently received by the client.

4. The method for self-adaptively adjusting a data transmission rate according to claim 1, further comprising:
receiving control information from the client;
adjusting the new data transmission rate to any rate lower than a current rate when the control information includes an instruction to lower the data sending rate;
determining whether sent data is a real-time service when the control information is control information about suspending sending the data;
if the sent data is a non-real-time service, suspending sending the data;
if the sent data is a real-time service, discarding the data of at least one data unit in the send buffer; and
adjusting the new data transmission rate to a rate that is the same as the original service bit rate, when the control information is control information about sending data according to the original service bit rate.

5. The method for self-adaptively adjusting a data transmission rate according to claim 1, wherein discarding of the data of at least one data unit in the send buffer comprises:
sequencing data in the send buffer according to importance of influence on user experience; and
successively selecting and discarding the data of at least one data unit from the sequenced data in an order from lowest to highest importance of influence on user experience.

6. A server including a computer wherein the computer comprises a computer readable medium comprising instructions stored therein, the server comprising:
a receiving unit configured to receive parameters sent from a client;
a calculation unit configured to calculate a predicted value of a new data transmission rate from the server to the client, according to an initial data transmission rate based on a ratio of maximum storage value and current storage value of a network buffer in the server and according to the received parameters;
a judgment unit configured to determine the predicted value of the new data transmission rate from the server to the client is less than an original service bit rate which comprises a write speed of the network buffer in the server; in order to predict an overflow of the network buffer in the server by comparing the predicted value of the new data transmission rate from the server to the client and the original service bit rate of the network buffer in the server, wherein the overflow of the network buffer in the server takes place when the write speed is greater than a read speed of the network buffer in the server, and the predicted value is calculated ;and
adjusting by the server, the initial data transmission rate to the predicted value of a new data transmission rate from the server to the client, if the predicted value of the new data transmission rate from the server to the client is not less than the original service bit rate, otherwise, discarding data of at least one data unit in a send buffer of the server.

7. The server according to claim 6, wherein the calculation unit comprises:

a first calculation module configured to calculate the current value of the server network buffer according to a received maximum sequence number of a Real-time Transfer Protocol (RTP) packet currently received by the client and a received packet loss ratio in the client when the parameters received by the receiving unit include an expected value of a client buffer, a current value of the client buffer, the maximum sequence number of the RTP packet currently received by the client, and the packet loss ratio in the client; and a first rate calculation module configured to calculate an adjustment coefficient of the new data transmission rate according to the maximum storage value of the network buffer in the server, the received expected value, the received current value of the client buffer, and the calculated and obtained current storage value of the network buffer in the server; and multiply a data transmission rate of a last cycle by the adjustment coefficient of the new data transmission rate, so as to obtain the predicted value of the new data transmission rate.

8. The server according to claim 6, wherein the calculation unit comprises:

a second calculation module, configured to calculate a current storage value of the network buffer in the server according to a received maximum sequence number of an RTP packet currently received by the client and a received packet loss ratio in the client when the parameters received by the receiving unit are a data transmission rate currently received by the client, the maximum sequence number of the RTP packet currently received by the client, and the packet loss ratio in the client; and a second rate calculation module configured to calculate the predicted value of the new data transmission rate according to the ratio of maximum storage value and the calculated current storage value of the network buffer in the server, and the received data transmission rate currently received by the client.

9. The server according to claim 6, wherein the receiving unit is further configured to receive control information sent by the client;

the rate adjustment unit is further configured to adjust the new data transmission rate to any rate lower than a current rate when the control information received by the receiving unit is control information about lowering the data sending rate; and the rate adjustment unit is further configured to judge whether sent data is a real-time service, when the control information received by the receiving unit is control information about suspending sending the data, and suspend sending the data if the sent data is a non-real-time service;

the discarding unit is further configured to discard the data of at least one data unit in the send buffer if the sent data is a real- time service; and the rate adjustment unit is further configured to adjust the data sending rate to a rate that is the same as the original service bit rate, when the control information received by the receiving unit is control information about sending data according to the original service bit rate.

10. The server according to claim 9, wherein the discarding unit comprises:

a sequencing module configured to sequence data in the send buffer according to importance of influence on user experience; and a discarding module configured to successively select and discard the data of at least one data unit from the sequenced data in an order from low to high importance of influence on user experience.

11. A system for self-adaptively adjusting a data transmission rate including a computer wherein the computer comprises a computer readable medium comprising instructions stored therein, the system comprising:

a server that includes:

a receiving unit configured to receive parameters sent from a client;

a calculation unit configured to calculate a predicted value of a new data transmission rate from the server to the client, according to an initial data transmission rate based on a ratio of maximum storage value and current storage value of a network buffer in the server and according to the received parameters;

a judgment unit configured to determine the predicted value of the new data transmission rate from the server to the client is less than an original service bit rate which comprises a write speed of the network buffer in the server; in order to predict an overflow of the network buffer in the server by comparing the predicted value of the new data transmission rate from the server to the client and the original service bit rate of the network buffer in the server, wherein the overflow of the network buffer in the server takes place when the write speed is greater than a read speed of the network buffer in the server, and the predicted value is calculated; and adjusting by the server, the initial data transmission rate to the predicted value of a new data transmission rate from the server to the client, if the predicted value of the new data transmission rate from the server to the client is not less than the original service bit rate, otherwise, discarding data of at least one data unit in a send buffer of the server; and a client that is configured to detect and analyze a relation between a current value of a client buffer and an expected value of the client buffer and a relation between the current value of the client buffer and a cache triggering condition value, and if the current value of the client buffer is greater than or equal to the cache triggering condition value, and the current value of the client buffer is less than the expected value of the client buffer, send parameters to the server.

12. A non-transitory computer readable medium comprising computer executable instructions which when executed by a computer unit, cause the computer unit to perform acts:

receiving by a server, parameters sent from a client;

calculating by the server, a predicted value of a new data transmission rate from the server to the client, according to an initial data transmission rate based on a ratio of maximum storage value and current storage value of a network buffer in the server and according to the received parameters;

determining by the server, whether the predicted value of the new data transmission rate from the server to the client is less than an original service bit rate which comprises a write speed of the network buffer in the server;

predicting by the server, an overflow of the server network buffer by comparing the predicted value of the new data transmission rate from the server to the client and the original service bit rate of the network buffer in the server, wherein the overflow of the network buffer in the server takes place when the write speed is greater than a read speed of the network buffer in the server; and adjusting by the server, the initial data transmission rate to the predicted value of a new data transmission rate from the server to the client, if the predicted value of the new data transmission rate from the server to the client is not less than the original service bit rate, otherwise, discarding data of at least one data unit in a send buffer of the server.

* * * * *